(No Model.)

H. T. MOODY.
DOOR HANGER SUPPORT.

No. 391,635. Patented Oct. 23, 1888.

WITNESSES.
Fred. B. Dolan.
J. M. Dolan.

INVENTOR.
Henry T. Moody,
by his attys
Clarke & Raymond.

UNITED STATES PATENT OFFICE.

HENRY T. MOODY, OF NEWBURYPORT, MASSACHUSETTS, ASSIGNOR TO THE VICTOR MANUFACTURING COMPANY, OF SAME PLACE.

DOOR-HANGER SUPPORT.

SPECIFICATION forming part of Letters Patent No. 391,635, dated October 23, 1888.

Application filed September 8, 1887. Serial No. 249,076. (No model.)

*To all whom it may concern:*

Be it known that I, HENRY T. MOODY, of Newburyport, in the county of Essex and State of Massachusetts, a citizen of the United States, have invented a new and useful Improvement in Door-Hanger Supports, of which the following is a full, clear, and exact description, reference being had to the accompanying drawings, forming a part of this specification, in explaining its nature.

The invention relates to means for supporting the rail or track of a door-hanger; and its object is to provide a simple and cheap way of joining the ends of the rail or track together and for fastening them rigidly to the beam or other support.

It is very essential for the proper operation of the hanger that the rail or track be straight, and where made of two or more pieces or sections that they be joined rigidly together and in such a manner as to prevent one getting out of line with the other.

Figure 1:
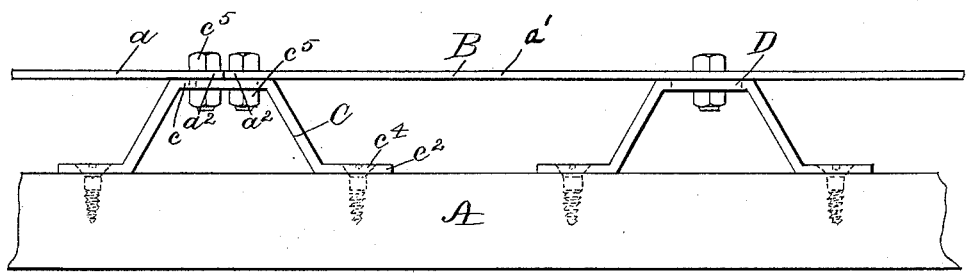
Figure 2:
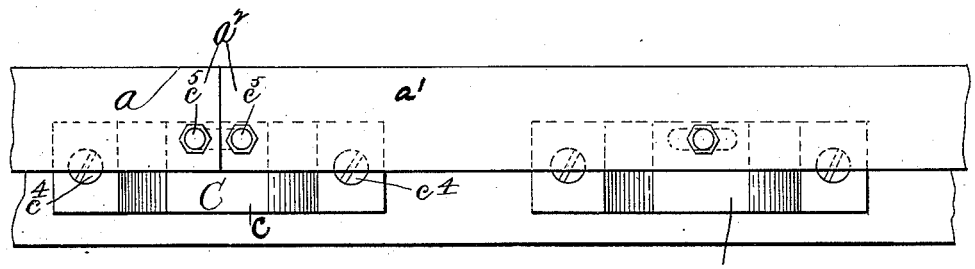
Figure 4:
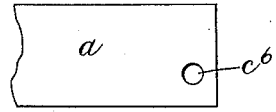
Figure 3:
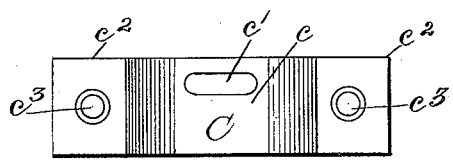

In the drawings, Figure 1 is a view in plan of a door-hanger track and its supports having the features of my invention. Fig. 2 is a view in elevation thereof. Fig. 3 is a view of one of the brackets for supporting the rail or track. Fig. 4 is a detail view of the end of one rail.

A represents the scantling, beam, or strip to which the rail or track is secured.

B represents the rail or track. It is made of flat metal, preferably of steel, in two or more sections or parts, $a$ $a'$, the ends $a^2$ of which abut. To join these ends in a manner to keep them in line and also to support the track or rail, I use a bracket, C, preferably made of metal, by casting or striking up, and having the plane wide surface $c$, (see Figs. 2 and 3,) and the long bolt hole or slot $c'$, and also having the ears $c^2$, provided with bolt or screw holes $c^3$, through which the fastening-screws which secure the bracket to the support A extend. (See Figs. 1 and 2.) The bracket C is placed so that the ends $a^2$ of the rail rest upon its plane surface $c$ and abut thereon, and these ends are secured to this section of the bracket by means of bolts $c^5$ or any equivalent fastening, there being a bolt or screw hole, $c^6$, in each abutting end of the rail-section through which a fastening-bolt extends into the slot $c'$. This renders the section $c$ of the bracket not only a support for the rail but also a clamping or binding plate, in that it serves to rigidly secure together the two ends of the rail-section in a way to keep them permanently in line.

The bolts or fastenings $c^5$ can extend through the slot $c'$ into the beam or support A. The bracket C may also be used with a single screw for supporting the rail-section between its ends, as represented at D, Fig. 2.

By making the bolt-hole $c'$ elongated or enlarged it is not necessary to make the rail-sections accurately, as the large holes permit a certain degree of variation in the relation of the joint to the plate $c$.

In lieu of the slot or long bolt-hole $c'$ the bracket may have two bolt-holes, and the slot or bolt-holes may extend crosswise the bracket instead of lengthwise, as represented in Fig. 3. This construction is desirable when the bracket is used at a right angle to the rail instead of on a line with it.

Having thus fully described my invention, I claim and desire to secure by Letters Patent of the United States—

A door-hanger support consisting of the combination, with brackets C, having ears $c^2$, provided with holes $c^3$, and plane surfaces $c$, provided with holes or slots $c'$, of a series of rail-sections, as $a$ $a'$, the abutted ends $a^2$ of which are provided with holes $c^6$ in alignment with each other, and the attaching-bolts $c^5$ passing through the said holes $c'$ $c^6$, whereby the rail-sections are rigidly secured to the supporting-brackets in proper alignment with each other, substantially as set forth.

HENRY T. MOODY.

Witnesses:
F. F. RAYMOND, 2d,
J. M. DOLAN.